(12) United States Patent
Minick et al.

(10) Patent No.: US 7,204,078 B2
(45) Date of Patent: Apr. 17, 2007

(54) STAGED EMITTER-ATTRACTOR ION DRIVE

(75) Inventors: Alan B. Minick, Stuart, FL (US); Benjamin Goldberg, Palm City, FL (US)

(73) Assignee: United Technologies Corporation, Hartford, CT (US)

( * ) Notice: Subject to any disclaimer, the term of this patent is extended or adjusted under 35 U.S.C. 154(b) by 357 days.

(21) Appl. No.: 10/895,775

(22) Filed: Jul. 21, 2004

(65) Prior Publication Data

US 2006/0017004 A1    Jan. 26, 2006

(51) Int. Cl.
*F03H 1/00* (2006.01)

(52) U.S. Cl. .......................................... 60/202; 60/204
(58) Field of Classification Search ............... 60/200.1, 60/202, 203.1, 204
See application file for complete search history.

(56) References Cited

U.S. PATENT DOCUMENTS

| 3,050,652 A | * | 8/1962 | Baldwin ...................... 60/202 |
| 3,367,114 A | * | 2/1968 | Webb .......................... 60/202 |
| 3,523,210 A | * | 8/1970 | Ernstene et al. ............. 60/202 |

* cited by examiner

*Primary Examiner*—L. J. Casaregola
(74) *Attorney, Agent, or Firm*—Bachman & LaPointe

(57) ABSTRACT

An ion drive system for creating a propulsion force or thrust has at least one stage having an emitter and an attractor spaced from the emitter by a gap. An ionizable dielectric media is located within the gap. The drive system further has a propellant source for introducing a propellant in the vicinity of the emitter and a power source for creating a high intensity field in the vicinity of the emitter to ionize the dielectric media and a diffused field in the vicinity of the attractor to accelerate the ions away from the emitter and thereby create a propulsive force. In a preferred embodiment, the ion drive system has a plurality of stages.

14 Claims, 1 Drawing Sheet

STAGED EMITTER-ATTRACTOR ION DRIVE

BACKGROUND OF THE INVENTION (1) Field of the Invention

The present invention is directed to a drive system for creating a propulsive force and in particular to a staged emitter-attractor ion drive system.

(2) Prior Art

Many different propulsion systems are known in the prior art. For example, there are systems for generating a thrust force using propellants and rocket motors. There are other systems involving the use of jet engines.

Despite the existence of a wide variety of propulsions systems, there remains a need for advanced drive systems. Particularly for supplying a propulsion force to a spacecraft.

SUMMARY OF THE INVENTION

Accordingly, it is an object of the present invention to provide an improved ion drive system for generating a propulsive force.

It is a further object of the present invention to provide a drive system which may be used to propel spacecraft and other vehicles.

The foregoing objects are attained by the present invention.

In accordance with the present invention, an ion drive system broadly comprises at least one stage having an emitter and an attractor spaced from the emitter by a gap. An ionizable dielectric media is located within the gap. The drive system further has a propellant source for introducing a propellant in the vicinity of the emitter and a power source for creating a high intensity field in the vicinity of the emitter to ionize the dielectric media and a diffused field in the vicinity of the attractor to accelerate the ions away from the emitter and thereby create a propulsive force. In a preferred embodiment, the ion drive system has a plurality of stages.

Other details of the staged emitter-attractor ion drive of the present invention, as well as other objects and advantages attendant thereto, are set forth in the following detailed description and the accompanying drawings, wherein like reference numerals depict like elements.

DETAILED DESCRIPTION OF THE PREFERRED EMBODIMENT(S)

The use of intense electric fields to create ions has been used in many applications. Repulsion of like charges after ionization has been used to accelerate ions away from an ionization source. The present invention recognizes this as a possible propulsion source. The present invention makes use of a combination of concentrated and distributed fields to repeatedly accelerate the initial ions, increasing their propulsive benefits without requiring an increase in a propellant flow.

Figure 1:
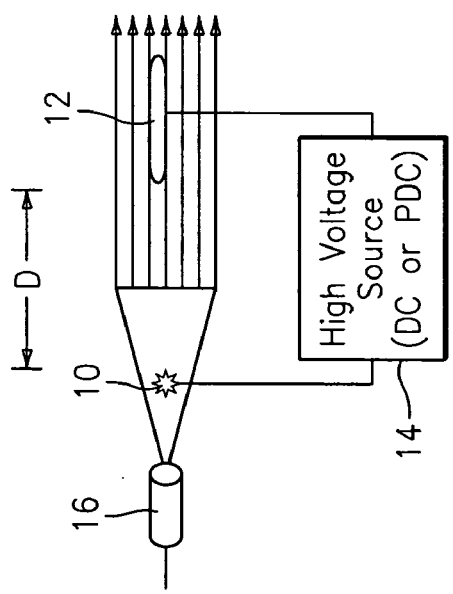
FIG. 1 is a schematic representation of an one stage ion drive system.

Referring now to FIG. 1, one stage of an ion drive system comprises an emitter 10 and an attractor (receiver) 12 spaced from the emitter 10. The emitter 10 and the attractor 12 may be made from any suitable electrically conductive material known in the art. For example, the emitter 10 and/or the attractor 12 may be formed from a carbon fiber material or from nanotubes. The emitter 10 is an ionization feature so it is much smaller in area than the attractor 12. In fact, the smaller and the sharper the emitter 10 is, the better. If desired, alpha particle emitters, such as americium, can be used to further enhance the ionization. The emitter 10 and the attractor 12 are electrically connected to a high voltage source 14. The high voltage source 14 may be a DC source or a pulsating direct current (PDC) source.

The ion drive system includes a propellant source 16 for discharging a propellant towards the emitter 10. The propellant may comprise any suitable propellant known in the art such as any stable gas including, but not limited to, the atmosphere. The propellant must be largely nonconductive, so water will not work. In operation, the propellant is ionized and not detonated.

One of the unique aspects of the ion drive system of the present invention is that it does not require any chamber or discharge nozzle. One of the special features of the ion drive system of the present invention is that it can be applied conformally to any body or wing and apply the propulsion over any surface, while reducing the boundary layer and reattaching the flow.

In each stage, a high intensity electric field, approaching the fluid breakdown potential, is preferably generated on the emitter 10, which has a reduced surface area as compared to the surface area of the attractor 12, when the emitter 10 is placed in the vicinity of the increased surface area attractor 12. The field concentration varies with a primary proportionality based on the ratio of the emitter surface area to the attractor surface area, concentrating the intense field around the emitter 10 while creating a diffused field around the attractor 12. The emitter-attractor gap distance D and the dielectric of the media in the gap further tailor the field intensities. The gap distance D may vary from approximately 0.001 inches to 6.0 inches. Further tailoring of the field can be accomplished through tailored or stratified dielectric modifications in the emitter-receiver gap, and through positioning of adjacent diffused fields. By putting coatings on the emitter, or attractor, or between them, the field shape and local intensity can be changed. By putting charged plates of lower intensity near the device, one can focus the field and flow by distorting the drive field.

Figure 2:
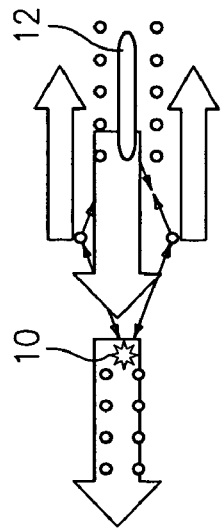
FIG. 2 is a schematic representation showing the ion and force characteristics of the drive system of FIG. 1.

As an ionizable dielectric media such as lithium, argon, xenon, etc. may be introduced at the high intensity field, ionization occurs. Preferably, the ionizable dielectric media has a low ionization potential. As shown in FIG. 2, the created ion bears the same charge as the ionizing source (the emitter 10) and is repelled. The present invention utilizes the attractor 12 with a diffused field insufficient to initiate ionization but strong enough to attract the ions being repelled by the ionization source. This attraction both continues to accelerate the ions and accelerates the attractor 12 towards the created ions. Both actions add to the forward propulsion. As the ion passes through the diffused attractor/receiver 12, field deionization may occur. Regardless, most ions pass adjacent to the receiver 12 while maintaining momentum away from the emitter 10. The foregoing describes a single stage emitter-attractor staged ion drive system for creating a propulsive force.

Figure 3:
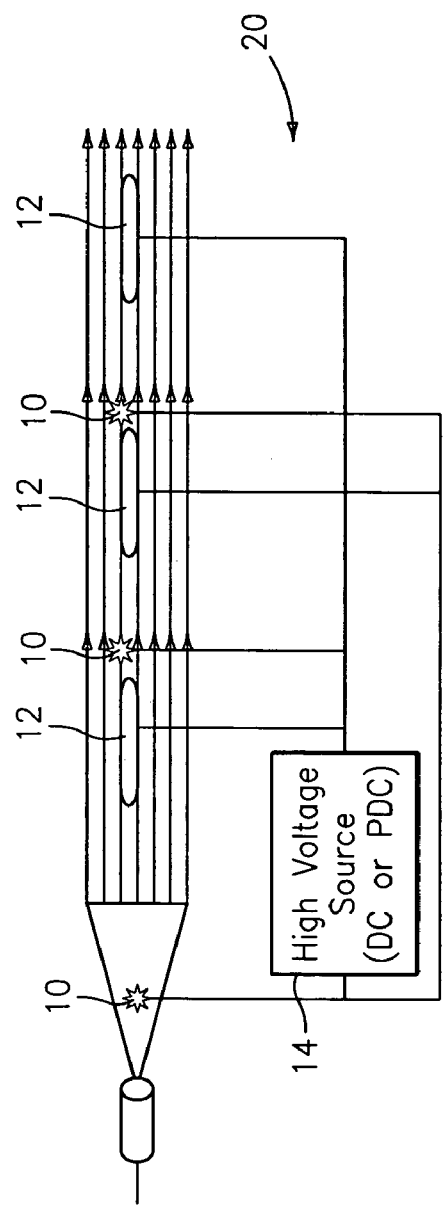
FIG. 3 is a schematic representation of a staged emitter-attractor ion drive system in accordance with the present invention.

Referring now to FIG. 3, an ion drive system 20 is shown in which additional stages have been added. The stages each contain an emitter 10 and an attractor 12. As can be seen, each of the emitters 10 and the attractors 12 are electrically connected to a common power source 14. In this type of system, the additional stages must be isolated to prevent reverse flow of oppositely charged particles, reducing propulsion effectiveness. Two measures may be used to accomplish this isolation. The first is to reverse the polarity of adjacent emitter-receiver pairs. This is demonstrated in FIG. 3. The second is to position the subsequent emitter 10 downstream of the prior stage diffused receiver field. Since these are similarly polarized, reverse flow is prevented while augmenting the attractive field strength of the prior attractor/receiver 12.

The ion drive systems of the present invention have particular utility for space vehicle propulsion systems. For example, they can be used to achieve orbital propulsion and for deep space propulsion. Still further, the ion drive systems of the present invention may be used and operated in the atmosphere and in a vacuum. The ion drive systems may also be used for high altitude propulsion, silent propulsion, and thrust augmentation on other types of vehicles.

It is apparent that there has been provided in accordance with the present invention a staged emitter-attractor ion drive which fully satisfies the objects, means, and advantages set forth hereinbefore. While the present invention has been described in the context of specific embodiments thereof, other alternatives, modifications, and variations will become apparent to those skilled in the art having read the foregoing description. Accordingly, it is intended to embrace those alternatives, modifications, and variations which fall within the broad scope of the appended claims.

What is claimed is:

1. An ion drive system comprising:
   at least one stage having an emitter and an attractor spaced from said emitter by a gap;
   an ionizable dielectric media located within said gap;
   a propellant source for introducing a propellant in the vicinity of the emitter; and
   means for creating a high intensity field in the vicinity of the emitter to ionize said dielectric media and a diffused field in the vicinity of said attractor to accelerate said ions away from said emitter and thereby create a propulsive force,
   wherein said emitter has a first surface area and said attractor has a second surface area greater than said first surface area.

2. An ion drive system according to claim 1, wherein said creating means comprises a DC power source.

3. An ion drive system comprising:
   at least one stage having an emitter and an attractor spaced from said emitter by a gap;
   an ionizable dielectric media located within said gap;
   a propellant source for introducing a propellant in the vicinity of the emitter; and
   means for creating a high intensity field in the vicinity of the emitter to ionize said dielectric media and a diffused field in the vicinity of said attractor to accelerate said ions away from said emitter and thereby create a propulsive force,
   wherein said creating means comprises a PDC power source.

4. An ion drive system according to claim 1, further comprising a plurality of stages and each said stage having an emitter and an attractor.

5. An ion drive system according to claim 4, wherein adjacent ones of said stages are isolated to prevent reverse flow of oppositely charged particles.

6. An ion drive system comprising:
   at least one stage having an emitter and an attractor spaced from said emitter by a gap;
   an ionizable dielectric media located within said gap;
   a propellant source for introducing a propellant in the vicinity of the emitter; and
   means for creating a high intensity field in the vicinity of the emitter to ionize said dielectric media and a diffused field in the vicinity of said attractor to accelerate said ions away from said emitter and thereby create a propulsive force,
   wherein adjacent ones of said stages are isolated to prevent reverse flow of oppositely charged particles, and
   wherein adjacent ones of said stages are isolated by having the polarity of adjacent emitter attractor pairs reversed.

7. An ion drive system according to claim 5, wherein a subsequent one of said adjacent stages has an emitter downstream of a diffused receiver field in a prior stage.

8. An ion drive system according to claim 6, wherein said emitter has a first surface area and said attractor has a second surface area greater than said first surface area.

9. An ion drive system according to claim 1, wherein said dielectric media is selected from the group consisting of lithium, argon, and xenon.

10. A method for creating a propulsive force comprising the steps of:
    providing at least one stage having an emitter having a first surface area and an attractor having a second surface area greater than said first surface area spaced from said emitter by a gap;
    providing an ionizable dielectric media located within said gap;
    providing a propellant source for introducing a propellant in the vicinity of the emitter; and
    creating a high intensity field in the vicinity of the emitter to ionize said dielectric media and a diffused field in the vicinity of said attractor to accelerate said ions away from said emitter and thereby create said propulsive force.

11. A method according to claim 10, wherein:
    said at least one stage providing step comprising providing a plurality of stages with each said stage having an emitter and an attractor; and
    isolating adjacent ones of said stages to prevent reverse flow of oppositely charged particles.

12. A method for creating a propulsive force comprising the steps of:
    providing at least one stage having an emitter and an attractor spaced from said emitter by a gap;
    providing an ionizable dielectric media located within said gap;
    providing a propellant source for introducing a propellant in the vicinity of the emitter; and
    creating a high intensity field in the vicinity of the emitter to ionize said dielectric media and a diffused field in the vicinity of said attractor to accelerate said ions away from said emitter and thereby create said propulsive force,
    wherein said at least one stage providing step comprises providing a plurality of stages with each said stage having an emitter and an attractor, and isolating adjacent ones of said stages to prevent reverse flow of oppositely charged particles, and wherein said isolating step comprises having the polarity of adjacent emitter attractor pairs reversed.

13. A method according to claim 11, wherein said isolating step comprises providing a subsequent one of said adjacent stages with an emitter downstream of a diffused receiver field in a prior stage.

14. A method according to claim 10, wherein said dielectric media providing step comprises providing a dielectric media selected from the group consisting of lithium, argon, and xenon.

* * * * *